June 12, 1934.  A. M. CANDY ET AL  1,962,297
WELDING APPARATUS
Filed Oct. 13, 1931   4 Sheets-Sheet 1
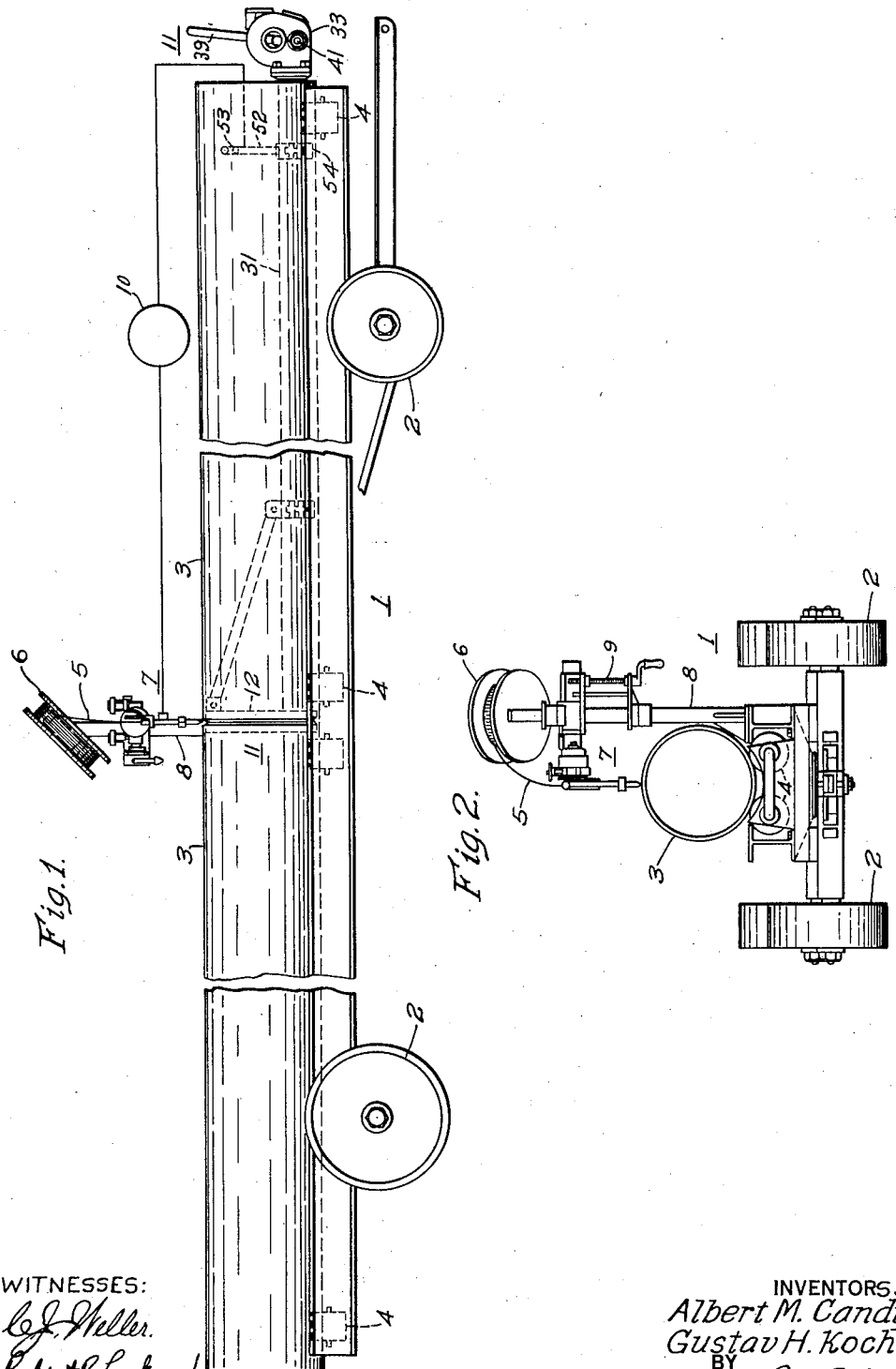
WITNESSES:
INVENTORS.
Albert M. Candy &
Gustav H. Koch.
BY
ATTORNEY

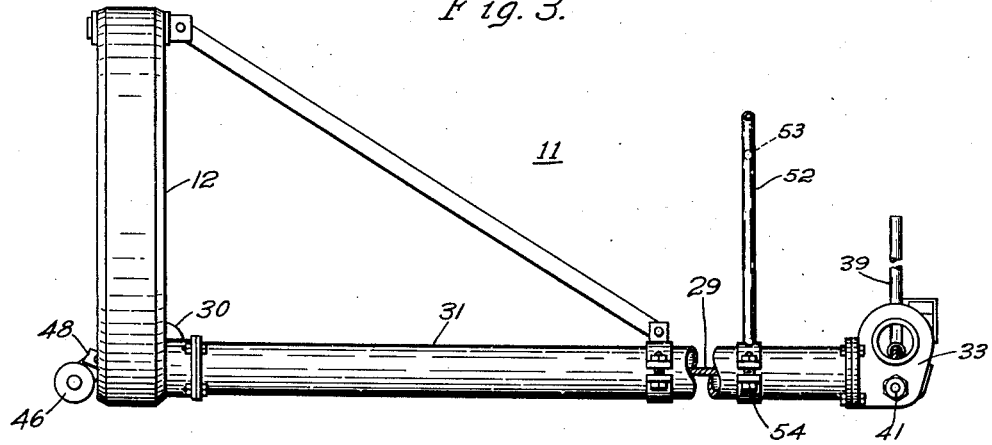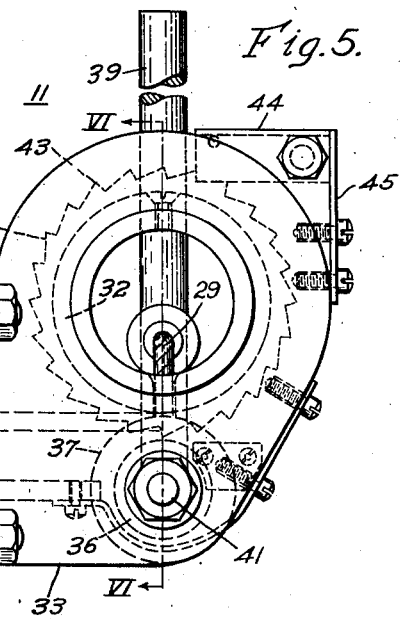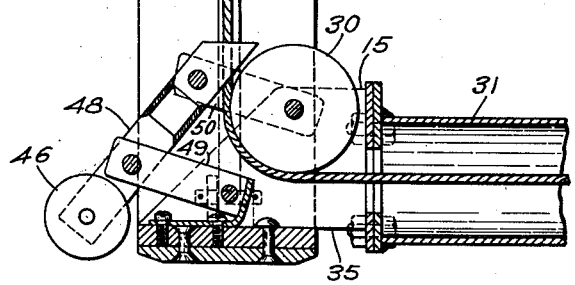

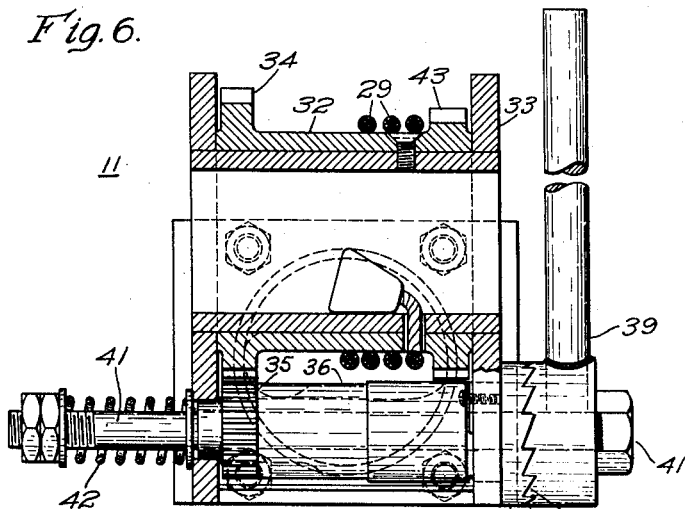
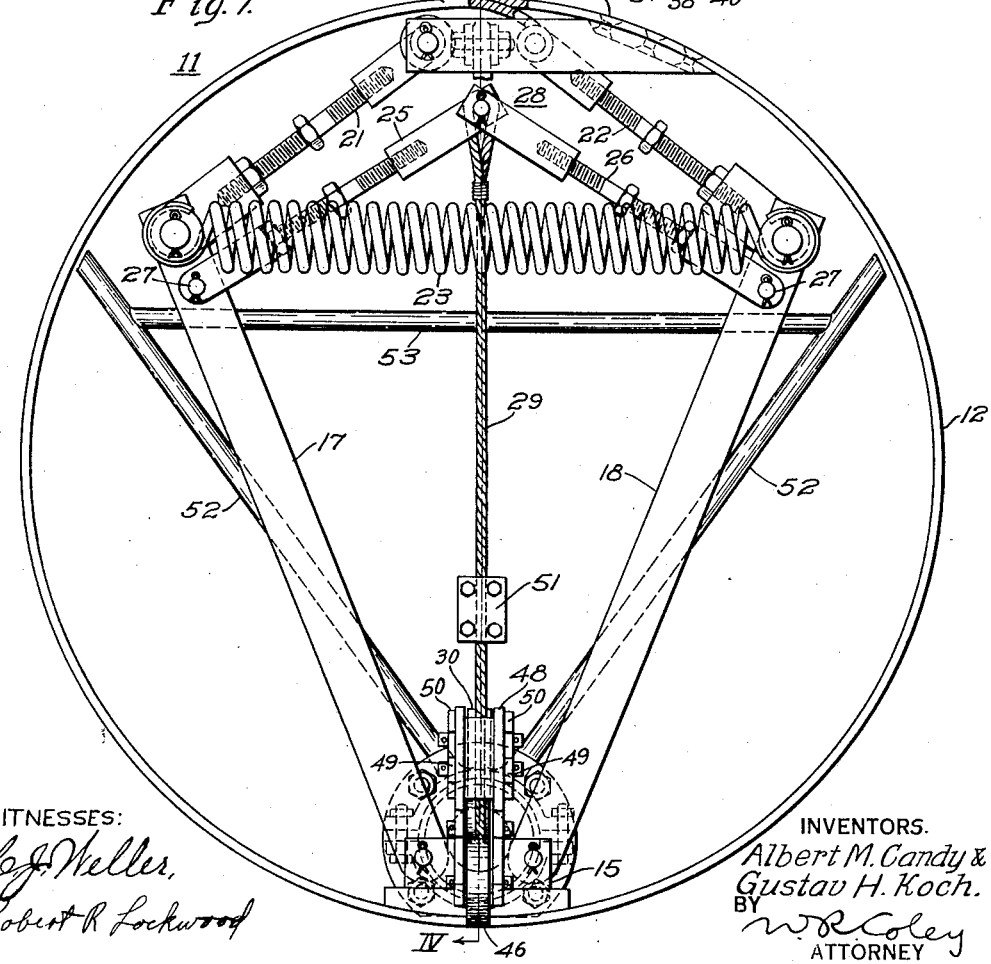

June 12, 1934.  A. M. CANDY ET AL  1,962,297
WELDING APPARATUS
Filed Oct. 13, 1931  4 Sheets-Sheet 4
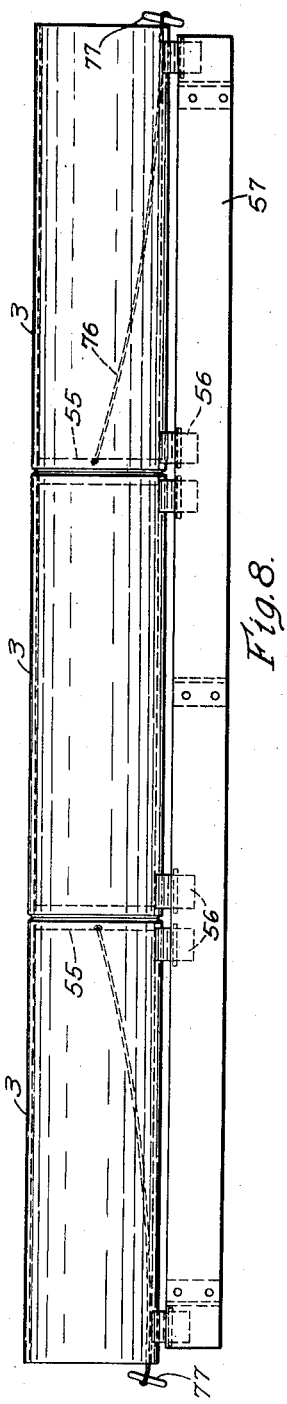
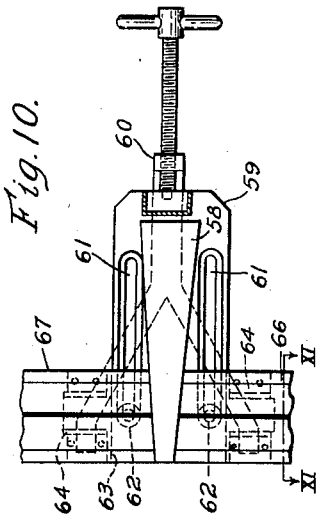
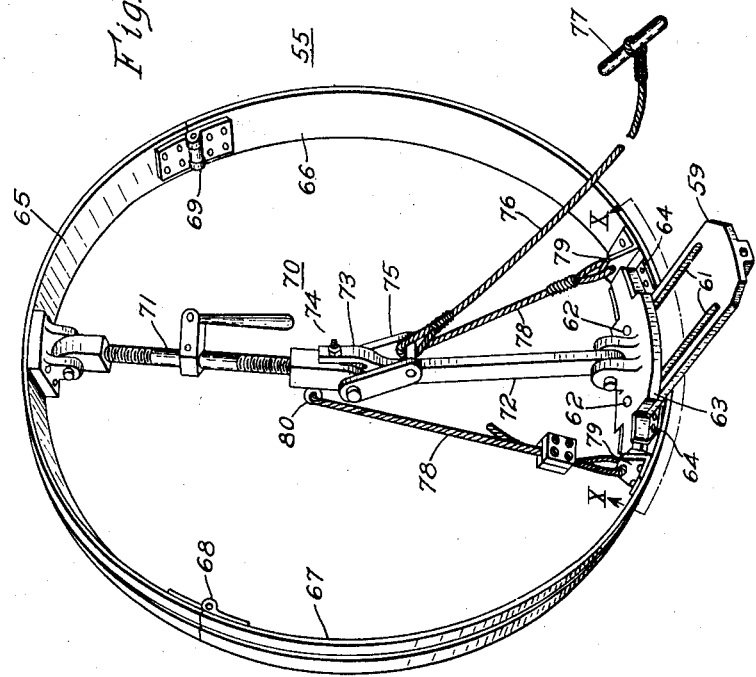
WITNESSES:
INVENTORS.
Albert M. Candy &
Gustav H. Koch.
BY
ATTORNEY Patented June 12, 1934

1,962,297

UNITED STATES PATENT OFFICE 1,962,297

WELDING APPARATUS

Albert M. Candy, Wilkinsburg, Pa., and Gustav H. Koch, Salem, Ohio, assignors to Westinghouse Electric & Manufacturing Company, a corporation of Pennsylvania Application October 13, 1931, Serial No. 568,542

15 Claims. (Cl. 219—6)

Our invention relates, generally, to welding apparatus, and, more particularly, to backing devices or mechanisms for assisting in the butt welding of pipes of large diameter.

The object of our invention, generally stated, is the provision of a collapsible backing device that shall be simple and efficient in operation and readily and economically manufactured and used.

A more specific object of our invention is to provide for backing the inner periphery of a joint between the abutting ends of pipes that are to be welded together.

Another object of our invention is to facilitate the removal of a backing device from pipes after they have been welded together.

Still another object of our invention is to provide for conducting welding current to pipes the abutting ends of which are to be welded together.

Other objects of the invention will, in part, be obvious and, in part, appear hereinafter.

The invention, accordingly, is disclosed in the embodiment hereof shown in the accompanying drawings, and comprises the features of construction, combination of elements and arrangement of parts which will be exemplified in the construction hereinafter set forth, and the scope of the application of which will be indicated in the claims.

For a more complete understanding of the nature and objects of the invention, reference may be had to the following detailed description, taken in connection with the accompanying drawings, in which:

Figure 1 is a view, in side elevation, of a pipe-welding machine showing a welding circuit and one modification of a backing device embodying the principal features of our invention;

Fig. 2 is a view, in end elevation, of the apparatus shown in Fig. 1, the backing device and welding circuit being omitted;

Fig. 3 is an enlarged view, in side elevation, of the backing device shown in Fig. 1;

Fig. 4 is a view showing a vertical section along the line IV—IV of Fig. 7, parts of the structure having been omitted to more clearly disclose certain details of construction;

Fig. 5 is an enlarged view, in side elevation, of the reeling mechanism shown in Fig. 3;

Fig. 6 is a sectional view, taken along the line VI—VI of Fig. 5, showing constructional details of the reeling mechanism;

Fig. 7 is an enlarged view, in end elevation, of the backing device shown in Fig. 3;

Fig. 8 is a view, in side elevation, of a pipe-welding machine in which a second modification of the invention is utilized;

Fig. 9 is a perspective view of the second modification of the invention;

Fig. 10 is a sectional view along line X—X of Fig. 9; and

Fig. 11 is a sectional view along line XI—XI of Fig. 10.

Referring now to Figs. 1 to 7, inclusive, of the drawings, 1 designates, generally, a pipe-welding machine having wheels 2 to permit the movement of the machine along a pipe line. As illustrated, two sections of pipe 3 are resting upon the machine 1 having ends abutting each other. In order to rotate the pipes 3 about their longitudinal axes, rollers 4 are provided which may be driven, in any suitable manner, to rotate the pipe sections as a unit. Since any well known driving arrangement may be utilized to drive the rollers 4, it has been deemed unnecessary to illustrate and describe any specific arrangement.

The abutting ends of the pipes 3 are welded together by means of a metallic welding electrode 5, which is automatically fed from a reel 6, by means of a suitable welding head 7, to the joint between the pipe ends, while the pipe sections are being rotated by means of the rollers 4. The welding head 7 is adjustably positioned on a standard 8 and may be moved relative thereto, for accommodating pipes of different diameters, by means of a lead screw 9.

A welding generator 10 of any well known type may be used to provide current for maintaining a welding arc between the electrode 5 and the pipe sections 3 which are to be welded together.

When abutting ends of pipes are welded together by means of a metallic electrode, it is necessary to back up the inner periphery of the joint between the pipes in order to prevent the welding arc from burning through the joint. It will be readily understood that the burning of the joint may be caused by slight irregularities in the ends of the pipes, which may prevent proper engagement between them around the entire circumference of the joint.

It is also desirable to provide for aligning the pipe sections in order to obtain a joint that will offer a minimum of resistance to the flow of fluids through them.

In order to provide for backing up the joint between the abutting ends of the pipe sections and to maintain them in alignment while they are being welded together, a backing device, shown generally at 11, is provided and utilized, as shown in Fig. 1.

The backing device 11 comprises an expansible backing ring 12, constructed preferably of copper and having overlapping end portions 13 and 14 to form a continuous ring when expanded. A bracket 15 is provided on the inner surface of the backing ring 12, and has a pair of lever arms 17 and 18 pivotally attached thereto. A pair of adjustable struts 21 and 22 are pivotally attached, at one end, to the overlapping end portions 13 and 14 and, at their opposite ends, to the lever arms 17 and 18, respectively.

A pair of tension springs 23 are attached, as illustrated in Figs. 4 and 7, to the joints between the lever arms 17 and 18 and the adjustable struts 21 and 22 in order to expand the ring 12 into engagement with the inner periphery of the joint between the abutting ends of the pipe sections. It will be readily understood that the springs 23 serve to transmit a substantially tangential force to the backing ring 12, thereby causing it to exert a uniform pressure against the entire inner circumference of the joint.

The backing ring 12 may be contracted by means of a second pair of adjustable struts 25 and 26 which are secured, at one end, by means of pins 27, to the lever arms 17 and 18 and are pivoted together at the other ends to form a toggle joint 28. When the toggle joint is moved downwardly, the springs 23 will be extended, and the lever arms 17 and 18 will be moved away from each other, thereby causing the struts 21 and 22 to move the overlapping end portions 13 and 14 toward each other, to contract the backing ring 12.

In order to operate the toggle joint 28 from a position external to the pipe for contracting the backing ring 12, a flexible cable 29 is provided which is attached, as shown, to the toggle joint. As shown in Fig. 4, the cable 29 is passed around a pulley 30, which is carried by the bracket 15, and through a tube 31 which is attached, at right angles, to the bracket 15. The other end of the cable 29 is attached to a winding drum 32 that is rotatably mounted in a housing 33 at the outside end of the tube 31. In this embodiment of the invention, the drum 32 is provided with gear teeth 34 which mesh with gear teeth 35 that are provided on a hollow shaft 36. As shown in the drawings, the shaft 36 is rotatably mounted in the housing 33 and is provided with an enlarged shoulder portion 37, outside of the housing, in which ratchet teeth 38 are cut. A handle 39, having ratchet teeth 40 for cooperating with the teeth 38, is carried by a bolt 41 which is slidably mounted within the hollow shaft 36. A spring 42 is provided, as illustrated, to maintain the ratchet teeth 38 and 40 in engagement and also to permit their disengagement for a purpose which will be described hereinafter.

It will be readily seen that the rotation of the handle 39, in a counter-clockwise direction, will cause the drum 32 to rotate, thereby winding up the cable 29 and contracting the backing ring 12. In order to maintain the backing ring 12 in the contracted position, the drum 32 is provided with ratchet teeth 43 and has a dog 44 cooperating therewith which is pivotally mounted on the housing 33. A leaf spring 45 is provided, as shown, to bias the dog 44 into engagement with the ratchet teeth 43 for preventing the reverse rotation of the drum 32.

In order to entirely remove the lower portion of the backing ring 12 from engagement with the pipe to facilitate its withdrawal from the pipe, a roller 46 is mounted in a carrier frame 48 which is attached to the bracket 15, by means of links 49 and 50, as shown in Fig. 4. A stop block 51, carried by the cable 29, moves the carrier frame 48 and the attached roller 46 downwardly, when the cable is withdrawn, until the lower portion of the backing ring is removed from engagement with the pipe.

When the pipe sections 3 are rotated during the welding operation, it is evident that the backing device will also rotate therewith. In order to maintain the tube 31 in alignment while the pipe is being rotated, a brace, having radially-extending members 52 and a cross member 53 therebetween, is provided. The brace may be attached to the tube 31 by means of a suitable clamp 54, as shown in Fig. 3.

In order to insure suitable electrical contact between the welding generator 10 and the pipe 3, one terminal of the generator may be connected, as shown in Fig. 1, to either of the brace members 52 or to the cross member 53 or to any other suitable part of the backing member 11, such as directly to the backing ring 12.

In order to use the backing device the two sections of pipe 3 are placed on the rollers 4, with the ends that are to be welded together in proper alignment. The backing device 11, with the ring 12 contracted, is placed in one end of the pipe and rolled along the bottom thereof on the roller 46 until the ring is symmetrically located with respect to the joint between the pipes. The handle 39 is disengaged from the ratchet teeth 38, and the dog 44 is removed from engagement with the teeth 43, thereby permitting the drum 32 to unwind and the springs 23 to force the backing ring 12 into engagement with the inner periphery of the joint. The pipe, together with the backing device, is then rotated by means of the power-driven rollers 4, while the metallic electrode 5 is automatically fed by the welding head 7 to perform the welding operation.

After the welding operation has been completed, the backing ring 12 is contracted by actuating the winding drum 32 by means of the handle 39 until the stop block 51 engages the carrier frame 48 and actuates the roller 46 into engagement with the pipe to remove the backing ring from engagement therewith. The backing device 11 may then be readily removed from the interior of the pipe in order that it may be used in the welding of another joint.

Referring now to Figs. 8 to 10, inclusive, of the drawings, a second modification of our invention is shown in which an articulated backing ring 55 is used for assisting in the welding of the abutting ends of the pipe sections 3 together. As illustrated, the pipe sections 3 may be placed on rollers 56 which are located in a suitable frame 57, to provide for the rotation of the sections during the welding operation. The rollers 56 may be driven in any suitable manner or they may be used only to support the pipe sections which are turned upon the rollers as the welding operation progresses.

The backing ring 55 is expanded into engagement with the inner periphery of the joint between the pipes by means of a wedge 58 which is carried by a slidably mounted plate 59 and is disposed to engage a wedge-shaped opening in the backing ring. In order to expand the backing ring 55 into engagement with the pipe sections 3, any suitable tool, such as the bifurcated screw clamp 60, may be used to force the wedge 58 into the wedge-shaped opening in the backing ring.

It will be observed that the plate 59 is provided with slots 61 with which screws or studs 62, located in a guide plate 63, cooperate to maintain the wedge 58 in proper alignment when it is being moved to expand the backing ring. The guide plate 63 may be properly positioned with respect to the backing ring 55 by any suitable means such as the provision of brackets 64 secured to the ring 55, as shown.

In order to provide for contracting the backing ring 55 to effect its disengagement from the pipe sections 3, after the welding operation has been performed, the ring is constructed of a plurality of sections 65, 66 and 67, which are connected by means of suitable hinges 68 and 69. A toggle mechanism shown generally at 70, is disposed within the ring 55 and comprises an adjustable strut 71 pivotally connected to the ring section 65, and a link 72 which is pivotally secured, at one end, to the strut 71 and to the guide plate 63 at the other end.

The toggle mechanism 70 may be retained in a holding position in any one of several ways. In this particular construction, an arm 73 is provided and is carried by the link 72. A stud bolt 74 is provided in the arm 73 for adjusting the off-center position of the toggle joint.

It will be noted that a clevis 75 is secured to the joint between the adjustable strut 71 and the link 72 and has attached thereto a cable 76 which is of such length as to extend from the joint between the pipes to a point outside the pipe. A handle 77 is provided at the end of the cable 74, thereby enabling the operator to more readily grasp the cable for withdrawing the backing mechanism.

In order to insure that the backing ring 55 shall be completely collapsed, a cable 78 is attached to brackets 79 which are secured to the sections 66 and 67 and is passed through an eye 80 that is located, as shown, on the lower end of the strut 71.

As shown in Fig. 11, the ring 55 is provided with a recessed portion 81 the diameter of which is slightly less than that of the main portion of the ring. It will be readily understood that, with a ring of this construction, a second pipe can be more readily positioned in abutting relation to the pipe in which the backing mechanism has already been partially placed, than would be the case if the ring sections were flat on the outer surface.

In using the backing mechanism just described, the middle section of the pipe 3 is first placed on the rollers 56. The backing mechanism is then inserted for a short distance into the end of the pipe, the large-diameter portion of the ring sections being entirely within the pipe and the small-diameter portion 81 extending therefrom to receive the other pipe section.

The length of the strut 71 is adjusted to obtain approximately the proper diameter of the ring 55, and the wedge 58 is then forced into the tapered opening between the ring sections 66 and 67 by means of the screw clamp 60, as shown more clearly in Fig. 10. It will be readily understood that the wedge 58 will exert substantially tangential forces on the ring 55, when it is moved into the tapered opening between the sections 66 and 67, and that these forces will be uniformly distributed throughout the entire periphery of the ring. When the ring 55 has been forced into proper engagement with the pipe, the clamp 60 is removed and another section of the pipe 3 is placed in position, with the cable 76 extending therethrough, as shown.

A third section of pipe 3 may be positioned at the opposite end of the middle section with a second backing ring 55 in position, as shown. The welding operation may then be performed, while the pipe sections 3 are being rotated by any suitable means.

It will be readily understood that any desired number of sections of pipe may be aligned at one time, since it is only necessary to increase the length of the cable 76 to extend it beyond the end of the last pipe section and to lengthen the frame 57 to accommodate the desired number of pipe sections.

It will also be understood that, in this instance, the welding operation may be performed manually or that any suitable automatic means may be utilized for feeding the welding electrode while the pipe is being rotated.

After the welding operation has been completed, the operator grasps the handle 77 and pulls on the cable 76 to collapse the backing ring 55. The pull of the cable 76 causes the toggle joint 70 to break and thereby lift the wedge plate 59 and guide plate 63 to move the wedge 58 from engagement with the ends of sections 66 and 67 of the backing ring.

As will be readily understood, the free ends of the ring sections are swung inwardly about the hinges 68 and 69 in response to the pull of the cable 78. The complete backing mechanism may then be readily removed or drawn from the interior of the pipe by means of the cable 76.

Since certain changes may be made in the above construction and different embodiments of the invention may be made without departing from the scope thereof, it is intended that all matter contained in the above description or shown in the accompanying drawings shall be interpreted as illustrative and not in a limiting sense.

We claim as our invention:

1. A backing mechanism for use in welding the abutting ends of pipes together comprising, in combination, a collapsible ring, means disposed to force the ring into engagement with the inner periphery of the joint between the pipes during the welding operation, and cooperating lever means for positively releasing the ring from engagement with the pipes after the welding operation has been performed.

2. A backing mechanism for use in welding the abutting ends of pipes together comprising, in combination, a backing member, means for expanding the backing member into engagement with the inner periphery of the joint between the pipes, and cooperating lever means for positively contracting the backing member in a plane at right angles to the longitudinal axes of the pipes.

3. In a welding machine in which abutting ends of pipes are to be welded together, in combination, a backing device having a removable unitary structure, said backing device including means for engaging the inner periphery of the joint between the pipes, and cooperating lever means associated with the backing device for positively contracting said means in a plane at right angles to the longitudinal axis of the pipe.

4. A backing mechanism for use in welding the abutting ends of pipes together comprising, in combination, a backing ring, means for exerting substantially tangential forces on the backing ring to force it into engagement with the inner periphery of the joint between the pipes, and means for contracting the backing ring in a plane at right angles to the longitudinal axes of the pipes.

5. A backing mechanism for use in welding the abutting ends of pipes together comprising, in combination, an expansible backing ring, resilient means disposed to move the ring into engagement with the inner periphery of the joint between the pipes, and cooperating lever means cooperating with said resilient means for removing the backing member for engagement with the pipes.

6. A backing mechanism for arc welding comprising, in combination, a spring-biased backing ring having overlapping ends and disposed to engage the inner periphery of a joint between abutting ends of pipes that are to be welded together, and cooperating lever means for removing the backing ring from engagement with the pipes after the welding operation has been performed.

7. A backing mechanism for use in welding the abutting ends of pipe sections together comprising, in combination, a backing member having overlapping ends, means disposed to move the backing member into engagement with the inner periphery of the joint between the pipes, means for releasing the backing member from engagement with the pipe, and means for locking the backing member in inactive position.

8. A backing mechanism for use in arc welding comprising, in combination, a circular expansible backing member having overlapping ends, resilient actuated means connected to the ends of the backing member for expanding the backing member into engagement with the inner periphery of a joint between abuting ends of pipes that are to be welded together, and means for contracting the backing member in a plane at right angles to the longitudinal axis of the pipe.

9. The combination, with an expansible backing mechanism for use in arc welding, of a tube extending at right angles to the backing device, a drum carried by the tube, means for rotating the drum, a pawl-and-ratchet mechanism associated with the drum, and a flexible cable attached to the backing device and to the drum for contracting the backing device on rotation of the drum.

10. A backing mechanism for arc welding comprising, in combination, a spring-biased backing member having overlapping ends, said backing member being disposed to engage the inner periphery of a joint between abutting ends of pipes that are to be welded together, and cooperating lever means for contracting the backing member in a plane at right angles to the longitudinal axis of the pipe.

11. A backing mechanism for arc welding comprising, in combination, a spring biased backing member having overlapping ends, said backing member being disposed to engage the inner periphery of a joint between abutting ends of pipes that are to be welded together, means for contracting the backing member in a plane at right angles to the longitudinal axis of the pipe, and means operated by said first named means for removing the backing member entirely from engagement with the pipe.

12. A backing mechanism for use in welding the abutting ends of pipes together comprising, in combination, a cylindrical articulated backing member, a wedge disposed to move the backing member into engagement with the inner periphery of the joint between the pipes, and a toggle mechanism disposed between the wedge and the opposite inner surface of said backing member for locking the backing member in engagement with the pipe.

13. A backing mechanism for use in welding the abutting ends of pipes together comprising, in combination, a cylindrical articulated backing member having different external diameters, means for forcing the backing member into engagement with the inner surface of the pipes to be welded, a toggle mechanism for locking the backing member in engagement with the pipe, and means disposed to extend through the pipe for contracting the backing member.

14. A backing mechanism for use in arc welding comprising, in combination, a circular expansible backing member having overlapping ends, a pair of lever arms pivotally mounted within the backing member, a pair of adjustable struts attached to the ends of the backing member and to the lever arms, a pair of springs attached to the same ends of the lever arms as the struts, a toggle mechanism also attached to the lever arms, a tube attached at one end to the backing member and extending at right angles thereto, a rotatable drum located at the other end of the tube, a pawl and ratchet mechanism associated with the drum, a flexible cable attached to the toggle mechanism at one end and to the rotatable drum at the other end, a carrier frame pivotally mounted on the backing member, a roller located in the carrier frame and a stop block carried by the cable and disposed to cooperate with the carrier frame.

15. A backing mechanism for use in welding the abutting ends of pipes together comprising, in combination, a backing member having a plurality of hinged segments, an adjustable strut pivotally carried by one of the segments, a link pivotally attached to the strut having an extended portion for limiting the relative movement between the strut and the link, a guide plate pivotally carried by the link, a plurality of brackets carried by the segments for locating the guide plate relative thereto, a wedge member slidably carried by the guide plate for radially expanding the backing member into engagement with the inner periphery of the joint between the pipes during the welding operation, and a cable attached to said strut and link to contract the backing member after the welding operation has been performed.

ALBERT M. CANDY.
GUSTAV H. KOCH.